United States Patent
Inam et al.

(10) Patent No.: US 11,805,337 B2
(45) Date of Patent: Oct. 31, 2023

(54) METHOD AND SYSTEM FOR AUTOMATICALLY PROTECTING RADIO NETWORK EQUIPMENT IN EXTREME ENVIRONMENTAL CONDITIONS

(71) Applicant: TELEFONAKTIEBOLAGET LM ERICSSON (PUBL), Stockholm (SE)

(72) Inventors: Rafia Inam, Västerås (SE); Lackis Eleftheriadis, Gävle (SE); Junaid Shaikh, Sundbyberg (SE); Daniel Lindström, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 489 days.

(21) Appl. No.: 17/273,345

(22) PCT Filed: Sep. 14, 2018

(86) PCT No.: PCT/EP2018/074916
§ 371 (c)(1),
(2) Date: Mar. 4, 2021

(87) PCT Pub. No.: WO2020/052780
PCT Pub. Date: Mar. 19, 2020

(65) Prior Publication Data
US 2021/0345018 A1 Nov. 4, 2021

(51) Int. Cl.
*H04Q 1/02* (2006.01)
(52) U.S. Cl.
CPC .................. *H04Q 1/11* (2013.01)
(58) Field of Classification Search
CPC .................. H04Q 1/11; H04Q 1/02
See application file for complete search history.

(56) References Cited

U.S. PATENT DOCUMENTS

| | | | | |
|---|---|---|---|---|
| 5,903,433 A | * | 5/1999 | Gudmundsson | H05K 7/206 165/80.3 |
| 6,005,770 A | * | 12/1999 | Schmitt | G06F 1/20 361/679.48 |

(Continued)

FOREIGN PATENT DOCUMENTS

| CN | 106911972 A | 6/2017 |
|---|---|---|
| CN | 207050167 U | 2/2018 |

(Continued)

OTHER PUBLICATIONS

Office Action in corresponding/related Indian Application No. 202147016728 dated Feb. 10, 2022.

(Continued)

*Primary Examiner* — Hai V Nguyen
(74) *Attorney, Agent, or Firm* — PATENT PORTFOLIO BUILDERS PLLC

(57) ABSTRACT

Methods and systems automatically protect radio network equipment in extreme weather conditions such as sandstorms or snow-storms. A pair of phase-shift material grids having different orientations is installed at an air intake of the radio network equipment. One of the grids is powered to open or close the air intake according to a current amount of air-carried particles entering the radio network equipment and a temperature inside the radio network equipment. The current amount of air-carried particles entering the radio network equipment may be detected by a piezoelectric sensor.

20 Claims, 9 Drawing Sheets

(56) References Cited

U.S. PATENT DOCUMENTS

| | | | | |
|---|---|---|---|---|
| 6,119,768 A * | 9/2000 | Dreier | ................... | H05K 7/206 165/103 |
| 6,751,479 B1 * | 6/2004 | Knight | ................... | H04B 1/036 455/560 |
| 6,881,141 B2 * | 4/2005 | Knight | ................... | H04B 1/036 312/236 |
| 7,788,940 B2 * | 9/2010 | Madara | .............. | H05K 7/20818 62/333 |
| 8,261,565 B2 * | 9/2012 | Borror | .............. | H05K 7/20827 62/434 |
| 8,279,602 B2 * | 10/2012 | Sivanandan | ....... | H05K 7/20172 361/679.48 |
| 8,387,687 B2 * | 3/2013 | Baer | ................. | H05K 7/20736 165/299 |
| 9,025,330 B2 * | 5/2015 | Hodes | ............... | H05K 7/20754 361/698 |
| 9,484,615 B2 * | 11/2016 | Häger | ..................... | H01Q 1/02 |
| 11,469,488 B2 * | 10/2022 | Castronova | ............ | H01Q 1/246 |
| 2002/0093393 A1 * | 7/2002 | Henningsson | ............ | H01P 7/06 333/125 |
| 2004/0198213 A1 * | 10/2004 | Knight | ................... | H04B 1/036 454/184 |
| 2011/0085300 A1 * | 4/2011 | Sivanandan | ....... | H05K 7/20172 312/213 |
| 2011/0086589 A1 * | 4/2011 | Skrepcinski | ....... | H05K 7/20172 454/184 |
| 2012/0167818 A1 * | 7/2012 | Blum | ....................... | C01B 5/00 117/68 |
| 2014/0182811 A1 * | 7/2014 | Hager | ..................... | H01Q 1/02 165/104.34 |
| 2016/0358442 A1 * | 12/2016 | Takasu | ................... | G08B 25/14 |
| 2016/0371897 A1 | 12/2016 | Mantese et al. | | |
| 2017/0048910 A1 * | 2/2017 | Shor | ..................... | H04W 24/04 |
| 2018/0258809 A1 * | 9/2018 | Imada | ..................... | F01N 9/002 |
| 2018/0258820 A1 * | 9/2018 | Imada | ..................... | F01N 3/106 |
| 2021/0313666 A1 * | 10/2021 | Castronova | ............. | H01Q 1/02 |

FOREIGN PATENT DOCUMENTS

| | | |
|---|---|---|
| WO | 2017206116 A1 | 12/2017 |
| WO | 2017206119 A1 | 12/2017 |

OTHER PUBLICATIONS

International Search Report / Written Opinion dated Apr. 29, 2019 in related/corresponding PCT Application No. PCT/EP2018/074916.

Wikipedia post entitled "Piezoelectricity" 2 pages, last edited on Dec. 25, 2020, Retrieved Feb. 10, 2021 from Internet: https://sv.wikipedia.org/wiki/Piezoelektricitet.

Wikipedia post entitled "Shape-memory alloy," 15 pages, last edited on Jan. 13, 2021, Retrieved Feb. 10, 2021 from Internet: https://en.wikipedia.org/wiki/Shape-memory_alloy.

* cited by examiner

METHOD AND SYSTEM FOR AUTOMATICALLY PROTECTING RADIO NETWORK EQUIPMENT IN EXTREME ENVIRONMENTAL CONDITIONS

TECHNICAL FIELD

Embodiments of the subject matter disclosed herein relate to protecting radio network equipment deployed in areas with extreme weather conditions, more specifically, to hardware and software for automatically regulating airflow and air-carried particle protection.

BACKGROUND

The deployment of radio network equipment such as Radio Base Stations (RBSs) and Battery Backup Units (BBUs) has extended all over the planet, reaching out to remote areas with extreme environmental conditions to meet ever-increasing coverage demands. Nowadays, radio network equipment is deployed in areas that are far from cities and are, therefore, not easily serviced. The equipment may be exposed to extreme environmental conditions like hot temperatures, sand/dust storms, etc. (e.g., in Dubai), that not only shorten the equipment's life cycle, but also make necessary more maintenance and cleaning of equipment filters.

An RBS typically has the following main components: a GPS (Global Positioning System) receiver, a GPS antenna, a base station radio (with climate unit) and a power supply. Various configurations are in use. For example, a smart GPS antenna incorporates the GPS receiver, the GPS antenna, the power supply and the base station radio into a single compact unit. In another example, a modular receiver incorporates the GPS receiver, the power supply, and the base station radio in a single unit. The GPS antenna (and, optionally, the base station radio antenna) is separate from the modular receiver.

The RBS and BBU have fans and ventilation intakes on lateral walls of their housings. These intakes are often covered by a mesh grid to keep out snakes, rats or other small animals, but do not prevent sand and dust from reaching the equipment. Climate effects increase maintenance costs for such equipment, for example, because the intakes are frequently clogged with large amounts of sand/dust.

Thus, protecting equipment deployed in extreme weather conditions is difficult because, on one hand, they are hard to reach by service personnel, and, on the other hand, they need servicing often. Totally closing the fans and/or the ventilation holes/windows during sandstorms is not a solution because the equipment's temperature would increase excessively.

There is a need to control the air ventilation intake in variable and extreme weather conditions to extend the life of the climate unit air intake filter (the fan and filter), and thereby, extend the life, operation and reliability of equipment such as RBSs and BBUs and reduce maintenance costs.

SUMMARY

Embodiments described hereinafter perform an automated control of supplying power to one or other of two separate phase-shift material grids to vary airflow to radio network equipment according to a current amount of air-carried particles such as sand/dust or snow/ice and a temperature therein. This automated control limits the amount of air-carried particles entering the equipment while also maintaining an acceptable temperature, thereby improving reliability and reducing maintenance costs. The method may also be used for making predictions based on weather data, regarding upcoming extreme weather. The cellular coverage may be gracefully degraded in view of the predictions. Customer that are going to be affected by network operation degradation can be informed/notified in advance. The novel features are important for 5G services.

According to an embodiment, there is a method for automatically protecting radio network equipment, RNE, in extreme weather conditions. The method includes installing a sand/dust sensor and a pair of phase-shift material grids at an air intake of the RNE. The sensor is configured to detect a current amount of air-carried particles entering the RNE. The pair of phase-shift material grids have different orientations and are configured to open or close the air intake. The method further includes automatically powering one grid of the phase-shift material grids to open or close the air intake according to the current amount of air-carried particles and a temperature inside the RNE.

According to another embodiment, there is a system for automatically protecting RNE, in extreme weather conditions. The system includes a sensor configured to detect a current amount of air-carried particles entering the RNE, a temperature sensor configured to measure temperature inside the RNE, and a pair of phase-shift material grids having different orientations, configured and mounted to open or close an air intake of the RNE. The system also includes a controller connected to the sensor and to the pair of phase-shift material grids, the controller being configured to automatically supply power to one of the phase-shift material grids according to the current amount of air-carried particles and the temperature.

According to yet another embodiment, there is a non-transitory computer readable medium storing executable codes which when executed by a processor make the processor perform a method for automatically protecting an RNE in extreme weather conditions. The method includes receiving information about a current amount of air-carried particles entering the RBS and temperature inside the RNE and sending commands for powering one of a pair of phase-shift material grids according to the current amount of air-carried particles and the temperature. The phase-shift material grids have different orientations and are placed and configured to open or close an air intake of the RBS.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments are related to protecting radio network equipment in extreme weather conditions.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, particular features, structures or functions may be combined in any suitable manner in one or more embodiments.

Various embodiments described in this section provide hardware and software for automatic control of an intake opening of radio network equipment, RNE, deployed in an area with high ambient temperatures and sandstorms. However, similar hardware and software may be used when the equipment is deployed in an area with low temperatures and snowstorms. Although the following embodiments refer preferentially to sand/dust, the same concept applied to snow/ice—both sand/dust and snow/ice being types of air-carried particles.

Figure 1:
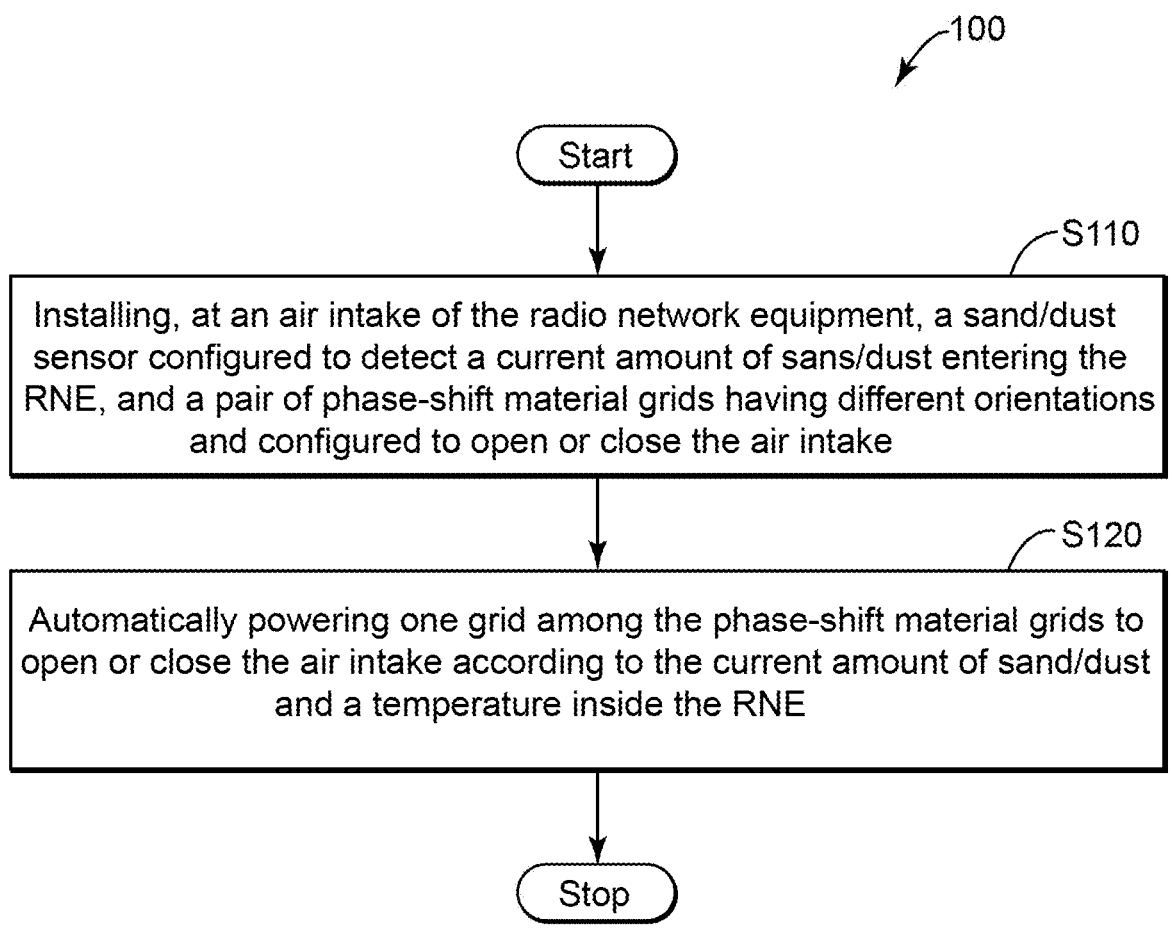
FIG. 1 is a flowchart of a method automatically protecting radio network equipment in extreme weather conditions according to an embodiment.
Figure 2:
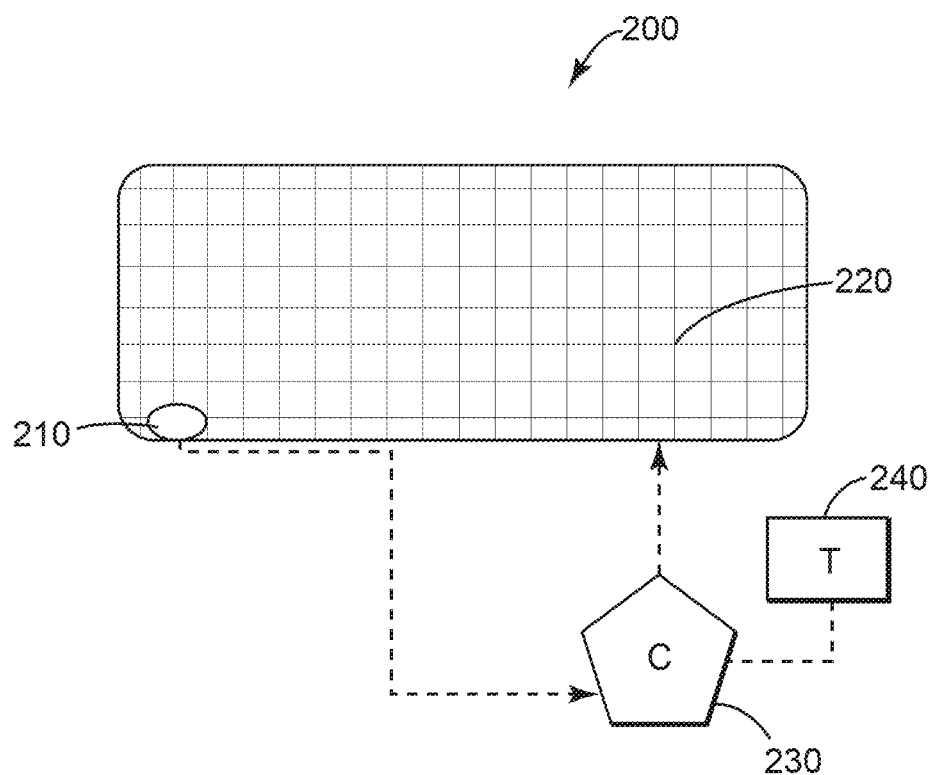
FIG. 2 is a schematic representation of a system for automatically protecting radio network equipment in extreme weather conditions according to an embodiment.

FIG. 1 is a flowchart of a method for automatically protecting RNE in extreme weather conditions. A schematic illustration of an RNE 200 is illustrated in FIG. 2.

Method 100 includes, at S110, installing a sand/dust sensor 210 and a pair of phase-shift material grids 220 at an air intake of the RNE. The sand/dust sensor 210 is configured to detect a current amount of sand/dust entering the RNE. For example, the sand/dust sensor is a piezoelectric sensor. The piezoelectric material is deformed by the pressure due to the wind carrying sand and/or dust. This deformation, which indicates the current amount of sand/dust entering the RNE, is measured, and, based on it, an electric power is produced in the electric wires connected to the phase-shift grids. Such sensors are commercially available. The pair of phase-shift material grids 220 has different orientations and is configured to open or close the air intake as later described.

Method 100 then includes, at S120, automatically powering one grid of the phase-shift material grids 220 to open or close the air intake according to the current amount of sand/dust and a temperature inside the RNE. A temperature sensor 240 is often already installed inside the RNE (e.g., inside a radio base station). The RNE may include a radio base station, RBS, and a battery backup unit, BBU, which may be housed inside the same box with a single air-cooling system or in separate boxes with separate cooling systems. The air intake is typically located on a vertical wall of such equipment box.

Figure 3A:
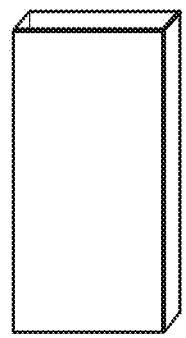
FIGS. 3A, 3B and 3C illustrate main components of a device configured to open and close an air intake according to an embodiment.
Figure 3B:
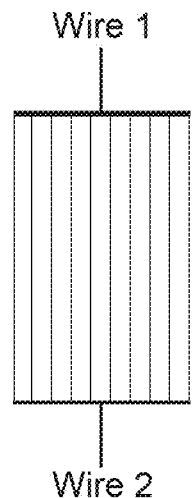
Figure 3C:
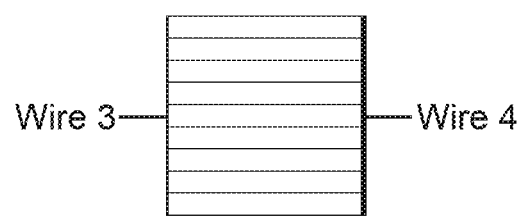

FIG. 3A illustrates a holder frame (which can be made of metal) configured to enable mounting the phase-shift material grids at the RNE's air intake. FIGS. 3B and 3C illustrate a first phase-shift material grid having a first (vertical) orientation, and a second phase-shift material grid having a second (horizontal) orientation. Wire 1 and Wire 2 are the electric wires connected to the vertical grid and Wire 3 and Wire 4 are the electric wires connected to the Horizontal grid. These wires are charged to provide high voltages to the grids that results to heat up and in turn to open or close the phase-shift grids.

Phase-shift material (sometimes called "memory material") is lightweight and has the quality that it remembers its original shape. That is, if objects made of phase-shift material are deformed, they return to their pre-deformed shape when heated. One such phase-shift material usable for manufacturing the pair of grids is a nickel-titanium alloy known as "Nitinol." Information about piezoelectric sensors and phase-shift materials is widely available.

A pair of phase-shift material grids placed at an air intake of an RNE operates in the following manner. Power is applied between the wires 1 and 2 of the first grid or between wires 3 and 4 of the second grid. When the applied power heats the phase-shift material with about 20-50 K, the grid changes shape, reversing to its original shape, e.g., opens or closes the air intake with 2-5 mm. The power is applied to one of the grids. When the powered grid reverts to its original shape, the other grid is deformed. Thus, the pair of phase-shift material grids changes its condition every time power is applied to the deformed grid, as shown in the following Table 1, thereby opening or closing the air intake to vary the amount of air and consequently sand/dust entering the RNE.

TABLE 1

| Air Intake State | Vertical Grid | Horizontal Grid |
| --- | --- | --- |
| Open, letting more air in | Power applied to wires 1 and 2 causing the vertical grid to return to its initial shape | No power on wires 3 and 4. The horizontal grid bends being pulled by the vertical grid. |
| Close, preventing air and sand/dust from entering the RNE | No power on wires 1 and 2. The vertical grid bends being pulled by the horizontal grid. | Power applied to wires 3 and 4 causing the horizontal grid to return to its initial shape |

Figure 4A:
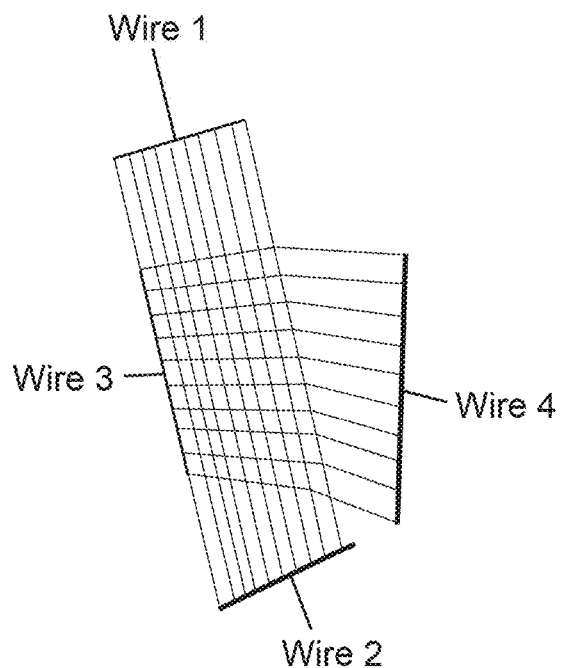
FIGS. 4A and 4B illustrate an open and a closed state of the device.
Figure 4B:
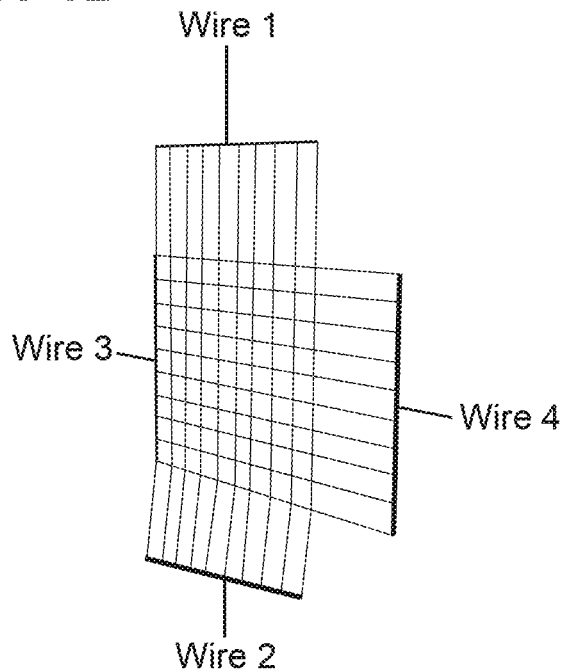

The open state is illustrated in FIG. 4A and the closed state in FIG. 4B. Thus, when power is applied to a first grid of the pair, no power is injected into a second grid of the pair, and, when power is applied to the second grid, no power is injected into the first grid. The first grid is isolated from the second grid so as to prevent power and heat transfer therebetween.

FIGS. 3B, 3C, 4A and 4B refer to embodiments with wires of the first grid perpendicular to the second grid, but this orientation relationship is illustrative and not intended to be limiting.

If the RNE includes an RBS, the method may include reducing data traffic in the RBS when the current amount of sand/dust detected by the sand/dust sensor triggers closing of the air intake. This feature is related to radio graceful degradation, RGD, a feature that may be included in 5G radio base stations. RGD is activated when the temperature inside the RBS becomes high and reduces the amount of data traffic through the RBS. Table 2 below illustrates power operation states with RGD.

TABLE 2

| Power | Grid 1 | Grid 2 | $T_{measured}$ | RGD Value |
|---|---|---|---|---|
| Power condition 1 | Value 1 | 0 | Tm ≤ Tthr | |
| Power condition 2 | Value 2 | 0 | Tm > Tthr | |
| Power condition 3 | 0 | Value 3 | Tm ≤ Tthr | |
| Power condition 4 | 0 | Value 4 | Tm > Tthr | |
| Power condition 5 | 0 | Value 5 | Tm > Tmax | Graceful degradation |

The values may have a 10 W difference, for activation (depending on the type of material). For example, for Grid 1, Value 1=10 W, Value 2=20 W, and for Grid 2, Value 3=10 W and Value 4=20 W. In this embodiment, graceful degradation occurs only when airflow is diminished to limit the increase of the amount of sand and dust in the equipment, and the RBS internal temperature increases.

The data traffic is reduced gradually depending on whether the measured temperature Tm is smaller or larger than a maximum temperature. In one embodiment, a different threshold may be used depending on whether the air intake's state is open or closed. Degradation of radio happens only when the opening hole is closed, and the RBS internal heat goes up.

Figure 5:
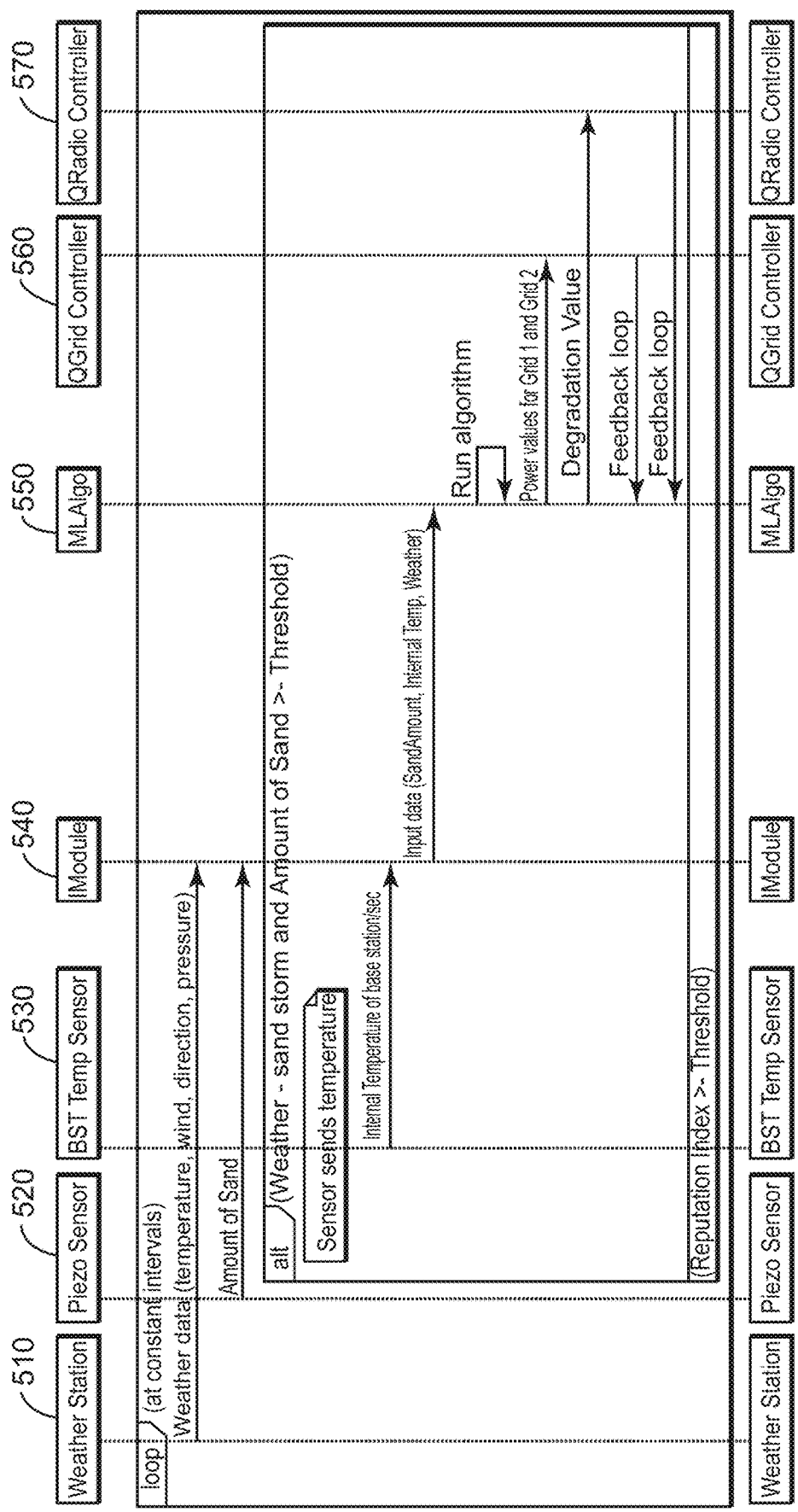
FIG. 5 is a sequence diagram illustrating automatic control of supplying power to a pair of grids mounted at an air intake according to an embodiment.

FIG. 5 is a sequence diagram illustrating automatic control of supplying power to a pair of grids mounted at an air intake of an RBS. A weather station 510 and a piezoelectric sensor 520 provide information to an input module 540 at predetermined time intervals. If weather station 520 indicates an upcoming sandstorm and the current amount of sand detected by piezoelectric sensor 520 exceeds a predetermined threshold, then input module 540 acquires temperature information from a temperature sensor 530 (reference 240 in FIG. 2) that measures current temperature inside the RBS. Input module 540 provides all the input information (i.e., current sand/dust amount, measured temperature, and weather forecast) to a decision module 550, which as discussed later may have been trained using machine learning techniques. Module 550 sends values of power to be applied to the first and the second grid to a power supply 560, and/or degradation values to a radio controller 570. Note that graceful degradation occurs only if temperature increases above a maximum temperature.

As mentioned above, decision module 550 may be trained using machine learning techniques. For example, a training process may include Markov decision processes enabling identification of actions needed to be taken at certain moments to achieve a desirable stable operation RBS state. For example, if the problem is to identify the optimal values of X and Y coordination phase shifts among a number of available values, then different actions can be taken (in the form of changing phase-shift values) under each environmental condition to achieve the best possible state, i.e., the lowest possible amount of dust particles on the site and required temperature.

Reinforcement learning may be used to optimize values of grid parameters depending on the intensity of storm and internal temperature of the RBS. During a wind/sandstorm (which can be simulated if needed), the following steps may be performed to train the decision module:

1. Initialize the learning system: define the long-term/final objective in terms of thresholds for the amount of dust and temperature at the RBS; define short-term objectives based on which of the rewards are to be assigned at each action;
2. Initialize the grid coordinates and radio controller randomly from a list of available values; human expert knowledge may be used to select the initialization action; the system is then in state so.
3. Wait for a pre-defined time interval t, and then acquire information about the measured temperature and the current amount of sand;
4. Identify the change in environment based on the acquired information (which may also include additional information received from the weather station);
5. Input weather-related features, last action taken (i.e., grid measurements set in the last action), RBS internal temperature and amount of sand measurements to a decision-making algorithm, which may be based on a model;
6. Provide commands to the grid controller and the radio controller according to the decision-making algorithm's output e.g., take no action to maintain an existing state if the short-term objective is reached OR update the grid parameters from the list of available parameters and move to a next state $s_i$.
7. Repeat steps 3-6 until the amount of sand/dust decreases under the predetermined threshold.

Q learning approach of reinforcement learning may be used to compute the immediate and cumulative reward. In this approach, the algorithm determines optimized command values and actions leading to certain desired states. Once these optimizations are identified, they are used when extreme weather (e.g., a sandstorm) is forecasted.

If the main objective is reducing a total amount of sand accumulation inside the equipment during a sandstorm, the machine learning algorithm may track the sand accumulation in view of a series of actions (e.g., when, how much and for how long the airflow is reduced by operating the pair of phase-shift material grids as in Table 1, such as to still not overheat the equipment).

A prediction model may then be built based on the historical values of X and Y coordination phase shifts, the time series of sand measurements and the RBS internal temperature along with the changing patterns of environmental conditions. This model may predict values of the amount of sand and temperature at a site (or RBS) based on new values of input features at a certain time T. Using the predicted values of the amount of sand, it may be estimated whether the amount of sand will exceed a predetermined threshold level, which would make servicing the station necessary. Changes of past scenarios may be made to lower this quantity while still maintaining RBS temperatures in an acceptable range.

Figure 6:
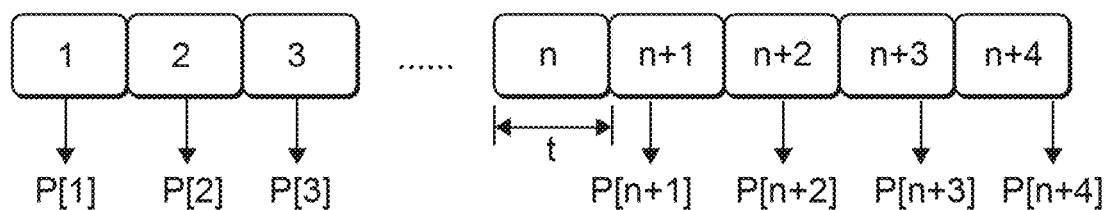
FIG. 6 illustrates model training for a length of prediction horizon of n time steps according to an embodiment.

FIG. 6 illustrates model training for a length of prediction horizon of n time steps in advance with a time interval t being a time-step length. If P[1] is the first prediction of the amount of sand for time step 1, and P[n+1] is the prediction of the amount of sand for (n+1)th time step, explicit actions may be taken to change the state of phase-shift material accordingly. The consequences of the planned actions may be logged as resulting sand amount and RBS temperature measurements. The model may be continually improved.

Figure 7:
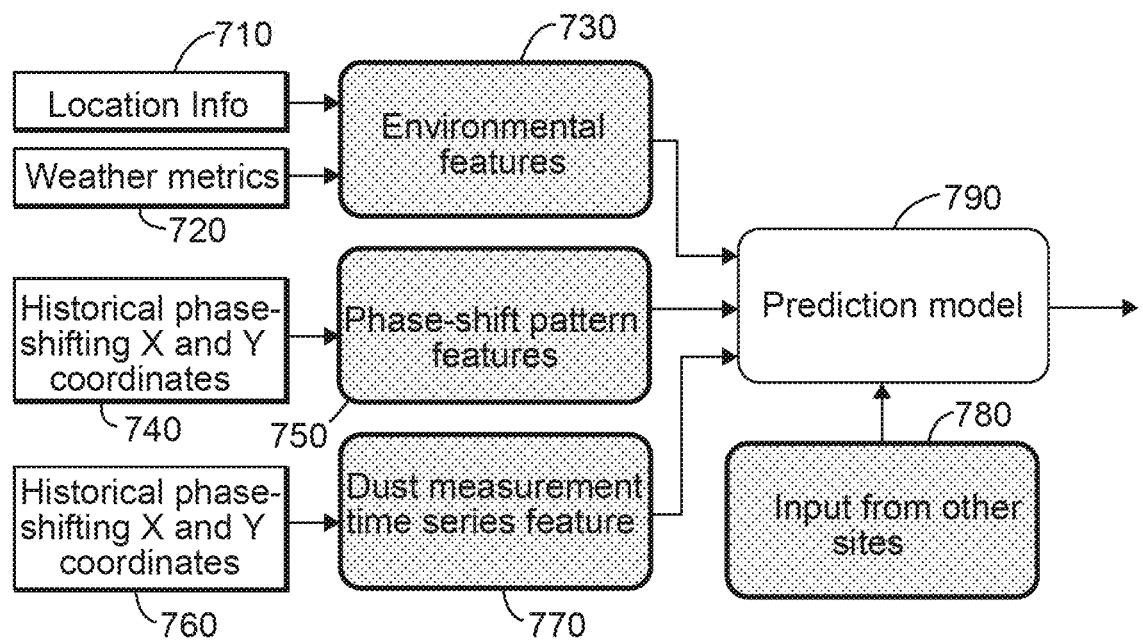
FIG. 7 is a graphical representation of a prediction model according to an embodiment.

FIG. 7 is a graphical representation of a prediction model 790's inputs. Local information 710 and weather metrics 720 (e.g., wind speed) constitute environmental features 730. Then, historical phase shifting X and Y coordinates 740 are considered to determine phase-shift pattern features 750.

In a different view, historical phase shifting X and Y coordinates 760 are considered from the perspective of dust measurement time series at 770. In addition to environmental features 730, phase-shift pattern features 750, and dust measurement time series 770, prediction model 790 may also receive inputs from other sites 780. The output of prediction model 790 is the predicted amount of dust after n time steps (not shown).

The RNE may include a radio base station, RBS, and a battery backup unit, BBU, each of which has a ventilation opening whose opening state is automatically controlled according to the current amount of sand/dust detected by the sand/dust sensor and the temperature.

Figure 8:
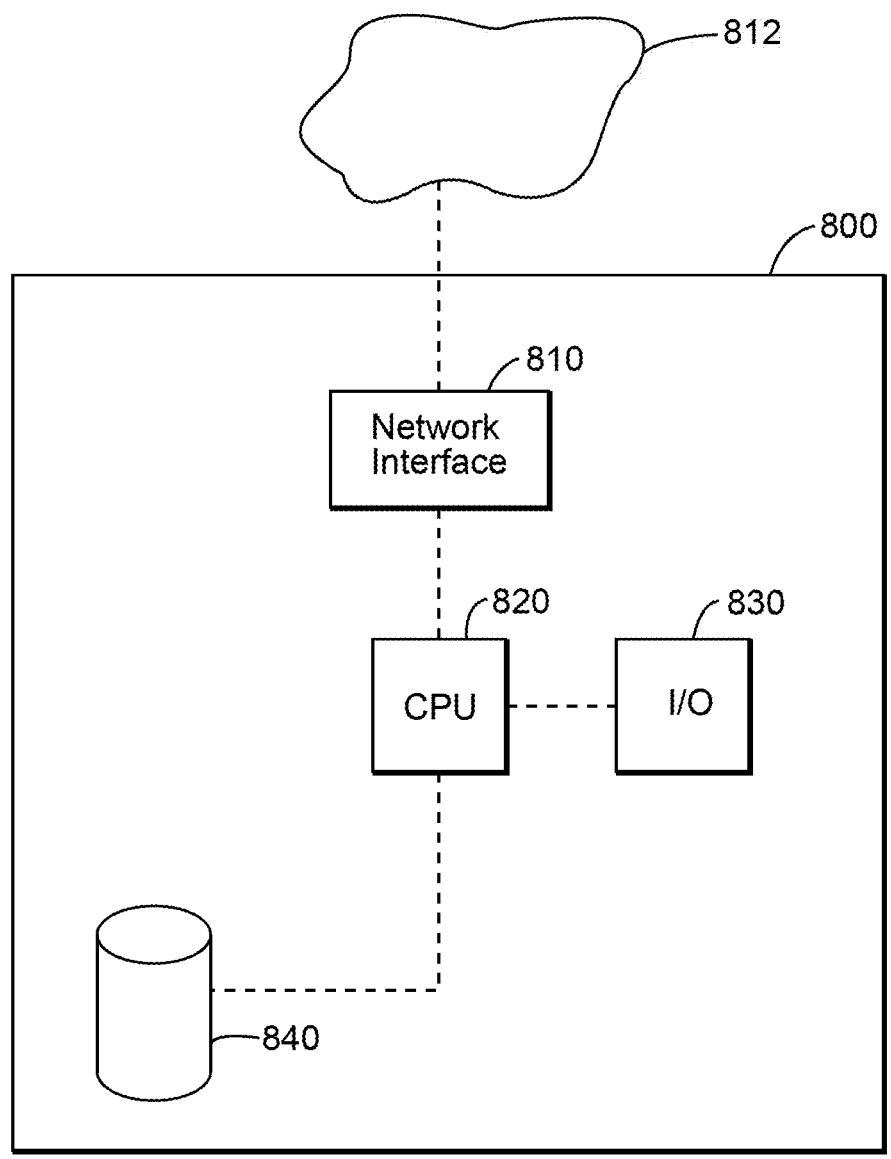
FIG. 8 is an apparatus for controlling a pair of phase-shift material grids according to an embodiment.

The modules 540 and 550 or controller 230 may be implemented as apparatus 800 in FIG. 8. Apparatus 800, which is connected (not shown) to a sand/dust sensor and to a pair of phase-shift material grids, is configured to automatically supply power to one of the phase-shift material grids according to the current amount of sand/dust and an inside temperature. Apparatus 800 has an interface 810 connecting it to a wired or radio communication network 812, and a central processing unit (CPU) 820 connected to interface 810 and including at least one processor. CPU 820 is also connected to a data storage device 840 and I/O 830.

The CPU is configured to receive information about a current amount of sand/dust entering the RBS and a temperature inside the RNE and generates commands for powering one of the phase-shift material grids to open or close an RNE air intake according to the current amount of sand/dust and the temperature. Data storage device 840 may store executable codes which, when executed by CPU 820, make it perform a method for automatically protecting radio network equipment, RNE, in extreme weather conditions.

Figure 9:
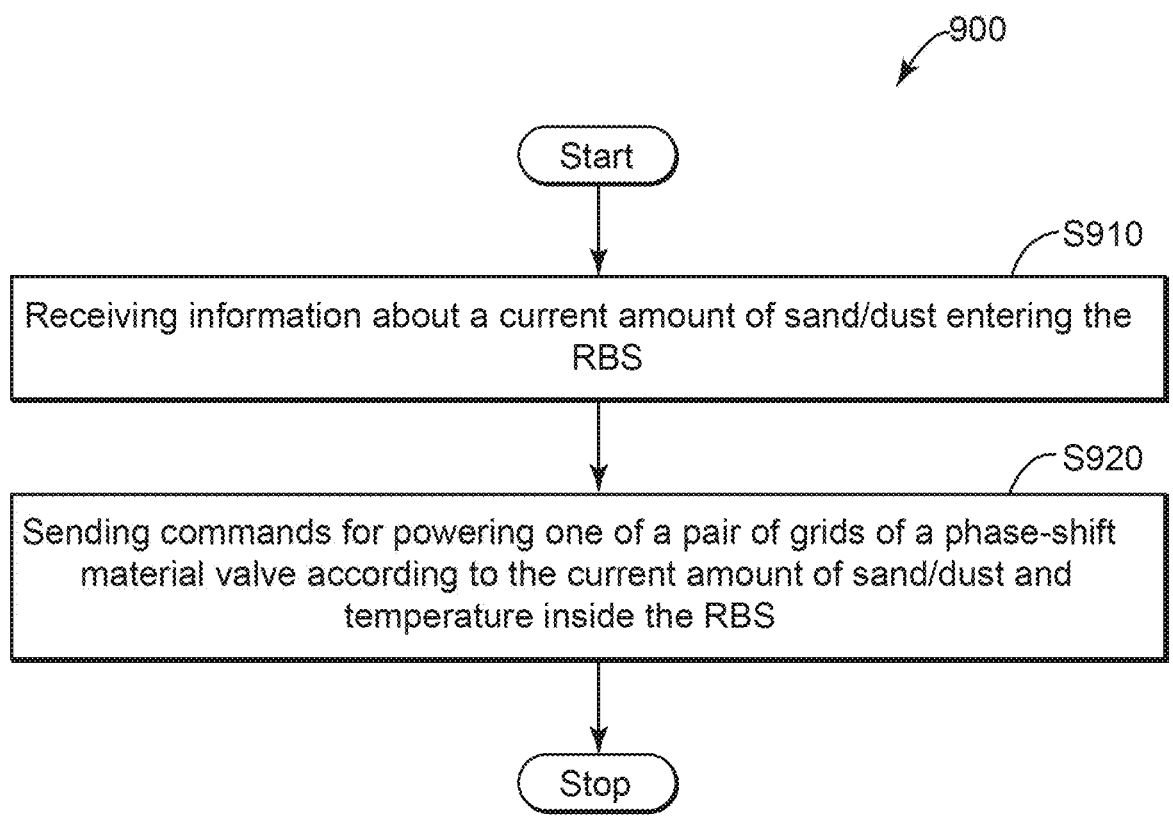
FIG. 9 is a flowchart of a method for automatically protecting radio network equipment in extreme weather conditions according to another embodiment.

For example, a flowchart of such a method 900 according to an exemplary embodiment is illustrated in FIG. 9. The method 900 includes receiving information about a current amount of sand/dust entering the RBS and temperature inside the RNE at S910. Method 900 further includes sending commands for powering one of a pair of phase-shift material grids according to the current amount of sand/dust and temperature inside the RNE at S920. Here, the phase-shift material grids that have different orientations are placed and configured to open or close the RBS's air intake.

Figure 10:
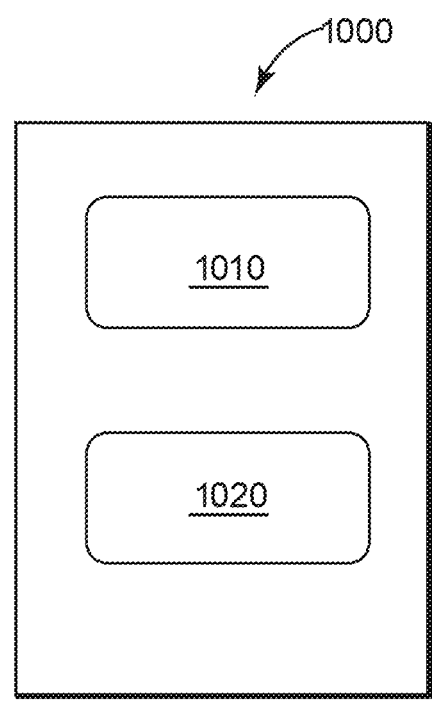
FIG. 10 is a diagram of hardware and software of an apparatus configured to automatically protect radio network equipment in extreme weather conditions according to another embodiment.

FIG. 10 illustrates a cant oiler 1000 according to another embodiment. Controller 1000 includes hardware and software modules 1010 and 1020. Module 1010 is configured to receive information about a current amount of sand/dust entering the RBS and temperature inside the RNE. Module 1020 is configured to send commands for powering one of a pair of phase-shift material grids according to the current amount of sand/dust, with the phase-shift material grids having different orientations and being placed and configured to open or close an air intake of the RBS (such as exemplarily illustrated in FIG. 2).

Some advantages of the above-described embodiments are: better protection of the radio network equipment from environmental effects, leading to longer life and improved reliability; lower maintenance costs, particularly by reducing the demand for personnel reaching remote areas to remove the sand; and better control of temperature heating inside the equipment. Prediction models based on machine learning algorithm optimize when and for how long to reduce airflow as well as graceful degradation values, which enables informing customers in advance, which is especially desirable for 5G Service Level Agreements (SLAs).

The embodiments disclosed in this section methods and systems for automatically protecting radio network equipment in extreme weather conditions. This description is not intended to limit the invention. On the contrary, the exemplary embodiments are intended to cover alternatives, modifications and equivalents, which are included in the scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments with particular combinations thereof, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for automatically protecting radio network equipment, RNE, in extreme weather conditions, the method comprising:
   installing, at an air intake of the RNE, a sensor configured to detect a current amount of air-carried particles entering the RNE, and a pair of phase-shift material grids having different orientations and configured to open or close the air intake; and
   automatically powering one grid of the phase-shift material grids to open or close the air intake according to the current amount of air-carried particles and a temperature inside the RNE.

2. The method of claim 1, wherein the sensor is a piezoelectric sensor.

3. The method of claim 1, wherein, when power is applied to a first grid of the pair no power is injected into a second grid of the pair, and, when power is applied to the second grid no power is injected into the first grid.

4. The method of claim 1, wherein one grid of the pair is perpendicular to the second grid and isolated from the second grid so as to prevent power and heat transfer therebetween.

5. The method of claim 1, wherein the automatically powering of the one of the pair of phase-shift material grids causes a 20-50K temperature increase and/or the air intake to open or to close with 2-5 mm.

6. The method of claim 1, wherein the RNE includes a radio base station, RBS, and the method further comprises:
   reducing data traffic in the RBS when the current amount of air-carried particles detected by the sensor triggers closing of the air intake.

7. The method of claim 6, wherein the data traffic is reduced when temperature inside the RBS exceeds a predetermined threshold.

8. The method of claim 6, wherein the data traffic is reduced gradually.

9. The method of claim 1, further comprising:
training a controller to perform the automatically powering using machine learning techniques.

10. The method of claim 1, further comprising:
training a controller using historic data to optimize the automatically powering using a predictive model,
wherein the controller receives weather information for an area where the RNE is deployed to apply the predictive model.

11. The method of claim 1, wherein the RNE includes a radio base station, RBS, and, a battery backup unit, BBU, each of which has a ventilation opening whose opening state is automatically controlled according to the current amount of air-carried particles detected by the sensor and the temperature.

12. A system for automatically protecting radio network equipment, RNE, in extreme weather conditions, the system comprising:
a sensor configured to detect a current amount of air-carried particles entering the RNE;
a temperature sensor configured to measure temperature inside the RNE;
a pair phase-shift material grids having different orientations, configured and mounted to open or close an air intake of the RNE; and
a controller connected to the sensor and to the pair of phase-shift material grids, the controller being configured to automatically supply power to one of the phase-shift material grids according to the current amount of air-carried particles entering the RNE and the temperature inside the RNE.

13. The system of claim 12, wherein the sensor is a piezoelectric sensor.

14. The system of claim 12, wherein, when power is applied to a first grid of the pair no power is injected into a second grid of the pair, and, when power is applied to the second grid no power is injected into the first grid.

15. The system of claim 12, wherein one grid of the pair is perpendicular to the second grid and isolated from the second grid to prevent power and heat transfer there-between.

16. The system of claim 12, wherein the RNE includes a radio base station, RBS, and the controller is further configured to trigger reducing data traffic in the RBS when the current amount of air-carried particles detected by the sensor causes closing of the air intake.

17. The system of claim 16, wherein the data traffic is reduced when temperature inside the RBS exceeds a predetermined threshold.

18. The system of claim 16, wherein the data traffic is reduced gradually.

19. The system of claim 12, wherein the controller is trained using machine learning techniques to automatically supply power to one of the phase-shift material grids according to the current amount of air-carried particles and the temperature.

20. A non-transitory computer readable medium storing executable codes which when executed by a processor make the processor perform a method for automatically protecting a radio network equipment, RNE, in extreme weather conditions, the method comprising:
receiving information about a current amount of air-carried particles entering the RBS and temperature inside the RNE; and
sending commands for supplying power to one of a pair of phase-shift material grids according to the current amount of air-carried particles and the temperature, the phase-shift material grids having different orientations and being placed and configured to open or close an air intake of the RBS.

* * * * *